J. STUBBS.
Road Scrapers.
No. 230,081.                                Patented July 13, 1880.
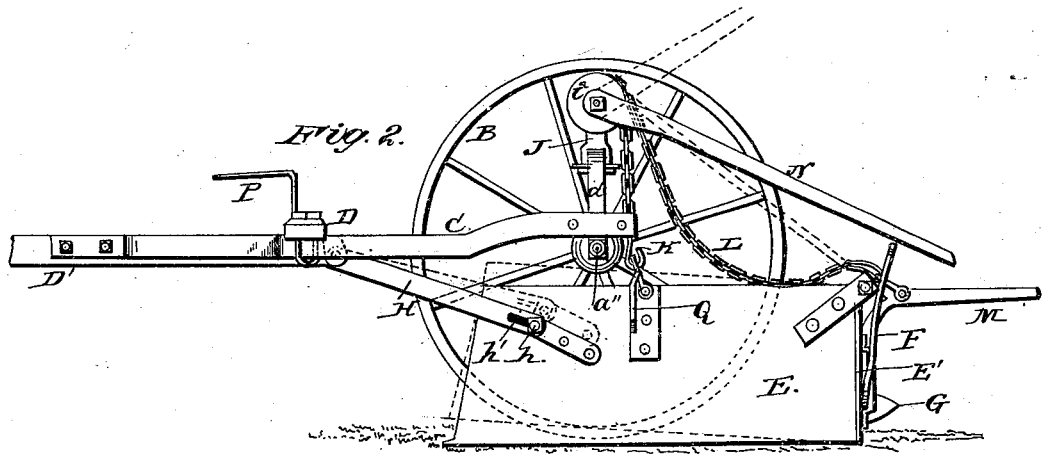
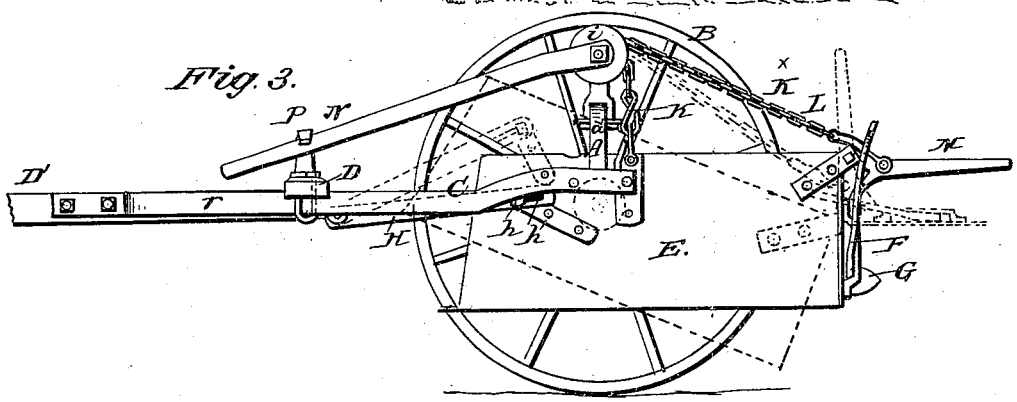
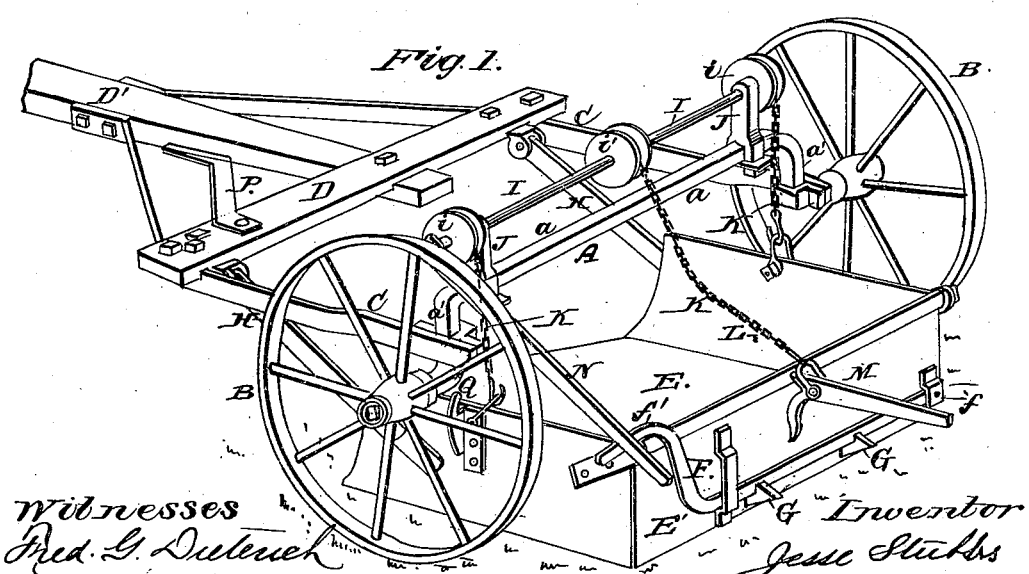

UNITED STATES PATENT OFFICE.

JESSE STUBBS, OF MOUNT PLEASANT, IOWA.

ROAD-SCRAPER.

SPECIFICATION forming part of Letters Patent No. 230,081, dated July 13, 1880.

Application filed December 6, 1879.

*To all whom it may concern:*

Be it known that I, JESSE STUBBS, of Mount Pleasant, in the county of Henry and State of Iowa, have invented certain new and useful Improvements in Road-Scrapers; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a perspective view of a wheel-scraper embodying my invention. Fig. 2 is a side elevation, showing the near wheel removed and the scraper in position for loading. Fig. 3 is a side elevation, same as Fig. 2, but showing the scraper loaded and elevated for carrying the dirt.

This invention relates to wheel-scrapers; and it consists in constructions and combinations hereinafter described, and set forth in the claims hereto annexed.

Referring to the drawings by letters, letter A represents an axle with elevated central portion, $a$, side vertical portion, $a'$, and horizontal ends $a''$, which serve as spindles or journals for the supporting-wheels B. Side bars, C, extend forward from the parts $a'$ of the axle, and are connected forward of the axle by a transverse bar, D.

A draft-pole, D', may be attached as shown, or in any other desirable manner, to the bars C D, or ordinary thills may be attached, if preferred.

E is the scraper-box, and has its rear end, E', hinged at its upper edge, so that it may swing open, as shown by dotted lines at Fig. 3 of the drawings.

F is a latch, pivoted at one end, $f$, to the end-gate E', and its other end, $f'$, curved upward and extending beyond the side of the scraper-box, to form a handle for operating it, and as a support for the lever which is used to raise and lower the scraper-box, as hereinafter described.

G G are catches extending back from the bottom of the scraper-box, so that the latch F may engage with them to hold the end-gate E' closed.

A draft-bar, H, is hinged to each side of the scraper-box by a stud, $h$, which projects from the side of the scraper-box through a slot, $h'$, in the bar H. The bars H are hinged at their front ends to the bar D, so that their rear ends may be raised and lowered to permit of raising and lowering the scraper-box, and the slots $h'$ allow the scraper-box to be lowered without being drawn forward.

I is a shaft journaled in bearings in standards J, which project upward from the axle A, and carries a pulley, $i$, at each end, and a pulley, $i'$, at its mid-length portion. A chain or cord, K, extends from each pulley $i$ downward, and is attached one to each side of the scraper-box. A chain or cord, L, extends from the pulley $i'$ downward, and is connected at its lower end with a handle, M, which projects rearward from the end-gate E'.

N is a hand-lever, attached at one end to the shaft I. P is a catch, pivoted at one end to the bar D. Q Q are lugs projecting laterally, one from each side of the scraper-box.

In the operation of scraping and loading the lever N is thrown back so as to rest upon the end $f'$ of the lever F, thus allowing the scraper-box to descend to the position shown by full lines at Fig. 2 of the drawings. When the scraper-box is loaded it may be elevated by turning the lever N forward, and it will be seen by reference to the full lines at Fig. 2 of the drawings that the taut chains K will be acted on before the slightly slack chain L, and thus raise the forward end of the scraper-box first, as shown by dotted lines at same figure. The lever N, when turned forward, as shown by full lines at Fig. 3 of the drawings, will elevate the scraper-box, so that it may be carried with its contained load on the wheels B. The catch P may be turned over the end of the lever N, as shown at Fig. 3 of the drawings, to hold it, and thus hold the scraper-box in the elevated position described. In elevating the scraper-box it will have a tendency to swing forward, which is prevented by the lugs or stops Q coming in contact with the vertical parts $a'$ of the axle. When it is desired to unload the latch F may be raised, when the chain L will open the end-gate E' and allow the scraper-box to tilt, as shown by dotted lines at Fig. 3 of the drawings, and discharge its load, when the handle M may be used to close the end-gate E' and allow the box to remain in an elevated position, or by turning the lever N backward the end-gate will close itself and the scraper-box be brought down into position for again loading.

What I claim as new, and desire to secure by Letters Patent, is—

1. In combination with the wheeled axle A, scraper-box E, and bars C D, the hinged slotted bars H, adapted to draw or drag the scraper-box and to allow it to be raised and lowered in a vertical plane, substantially as and for the purpose specified.

2. In a wheeled scraper, the combination of the wheeled axle A, bars C D, slotted draft-bars H H, scraper-box E, shaft I, having pulleys $i$ $i$, and the chains K L, the several parts constructed and relatively arranged to operate substantially in the manner herein shown and described.

In testimony that I claim the foregoing as my own I affix my signature in presence of two witnesses.

JESSE STUBBS.

Witnesses:
JAMES COSGROVE,
ROBT. S. GILLIS.